United States Patent
Hwang

(10) Patent No.: US 9,531,041 B2
(45) Date of Patent: Dec. 27, 2016

(54) BATTERY-COOLING SYSTEM FOR AN ELECTRIC VEHICLE

(71) Applicant: LG ELECTRONICS INC., Seoul (KR)

(72) Inventor: Jae Cheol Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 161 days.

(21) Appl. No.: 14/365,915

(22) PCT Filed: Dec. 14, 2012

(86) PCT No.: PCT/KR2012/010945
§ 371 (c)(1),
(2) Date: Jun. 16, 2014

(87) PCT Pub. No.: WO2013/089503
PCT Pub. Date: Jun. 20, 2013

(65) Prior Publication Data
US 2014/0308559 A1    Oct. 16, 2014

(30) Foreign Application Priority Data
Dec. 16, 2011  (KR) .................. 10-2011-0136473

(51) Int. Cl.
*H01M 10/663*    (2014.01)
*H01M 10/613*    (2014.01)
(Continued)

(52) U.S. Cl.
CPC ..... *H01M 10/5004* (2013.01); *B60H 1/00278* (2013.01); *B60K 1/04* (2013.01);
(Continued)

(58) Field of Classification Search
CPC .............. H01M 10/5004; H01M 10/50; H01M 10/6557
See application file for complete search history.

(56) References Cited

U.S. PATENT DOCUMENTS

2004/0163398 A1* 8/2004 Morishita .......... B60H 1/00278
                                                            62/186
2006/0073378 A1* 4/2006 Hamery .............. B60L 11/1874
                                                            429/120
(Continued)

FOREIGN PATENT DOCUMENTS

JP    2005-254974 A    9/2005
JP    2011-116321 A    6/2011
(Continued)

OTHER PUBLICATIONS

International Search Report dated Apr. 12, 2013 issued in Application No. PCT/KR2012/010945.

*Primary Examiner* — Carlos Barcena
*Assistant Examiner* — Wojciech Haske
(74) *Attorney, Agent, or Firm* — KED & Associates, LLP

(57) ABSTRACT

According to the present invention, a battery-cooling system for an electric vehicle is configured such that the cool air cooled by an air-conditioning device is directly supplied to a battery without passing through the interior of a vehicle, thus enabling the interior of the vehicle and the battery to be cooled independently from each other, thereby not only preventing noise or foreign substances from entering the battery from the interior of the vehicle, but also controlling a vehicle interior cooling operation and a battery cooling operation independently from each other. Further, a battery-cooling system for an electric vehicle according to the present invention is configured such that a suction fan is arranged at a discharge duct for discharging air from the interior of a battery, thus enabling air in the interior of the (Continued)

battery to be suctioned and discharged by the suction fan. The suctioning and discharge of air in the interior of the battery by the suction fan is advantageous since the flow resistance is reduced and smoother airflow can be achieved as compared to the case in which the suction fan is arranged at an inlet duct, thus improving cooling performance.

2 Claims, 4 Drawing Sheets

(51) Int. Cl.
    *B60L 1/00*           (2006.01)
    *B60L 11/18*         (2006.01)
    *B60H 1/00*          (2006.01)
    *B60K 1/04*          (2006.01)
    *H01M 10/625*      (2014.01)
    *H01M 10/6563*     (2014.01)
    *H01M 10/6557*     (2014.01)
    *H01M 2/10*         (2006.01)
    *B60K 1/00*          (2006.01)

(52) U.S. Cl.
    CPC ............ *B60L 1/003* (2013.01); *B60L 11/1805* (2013.01); *B60L 11/1864* (2013.01); *B60L 11/1874* (2013.01); *B60L 11/1879* (2013.01); *H01M 10/613* (2015.04); *H01M 10/625* (2015.04); *H01M 10/6557* (2015.04); *H01M 10/6563* (2015.04); *H01M 10/663* (2015.04); *B60H 2001/003* (2013.01); *B60K 2001/005* (2013.01); *B60L 2240/34* (2013.01); *B60L 2270/142* (2013.01); *H01M 2/1077* (2013.01); *H01M 2220/20* (2013.01); *Y02T 10/7005* (2013.01); *Y02T 10/7061* (2013.01)

(56) References Cited

U.S. PATENT DOCUMENTS

2007/0089442 A1    4/2007   Tsuchiya ..................... 62/186
2013/0146373 A1*  6/2013   Kosaki ................. B60K 1/04
                                                   180/65.1

FOREIGN PATENT DOCUMENTS

JP    WO 2012029089 A1 *  3/2012  ............ B60K 1/04
KR    10-2007-0065496 A     6/2007
KR    10-2011-0101458 A     9/2011
KR    10-2011-0126270 A    11/2011

* cited by examiner

BATTERY-COOLING SYSTEM FOR AN ELECTRIC VEHICLE

CROSS-REFERENCE TO RELATED PATENT APPLICATIONS

This application is a U.S National Stage Application under 35 U.S.C. §371 of PCT Application No. PCT/KR2012/010945, filed Dec. 14, 2012, which claims priority to Korean Patent Application No. 10-2011-0136473, filed Dec. 16, 2011, whose entire disclosures are hereby incorporated by reference.

TECHNICAL FIELD

The present invention relates to an electric vehicle and, more particularly, to a battery-cooling system for an electric vehicle which is capable of efficiently cooling a battery.

BACKGROUND ART

Generally, a vehicle refers to a machine that travels using a power generator as a power source, and carries people or loads or performs various operations. Vehicles can be classified according to types of power generator. Vehicles can be classified into a gasoline vehicle using a gasoline engine as the power generator, a diesel vehicle using a diesel engine as a power generator, a liquefied petroleum gas (LPG) vehicle using liquefied petroleum gas as a fuel, a gas turbine vehicle using a gas turbine as the power generator, and an electric vehicle (EV) employing a motor as a power generator and uses electricity charged in a battery.

Vehicles using fossil fuels such as gasoline, diesel and LPG cause environmental problems due to exhaust gas, exhausting the petroleum resource. Accordingly, an electric vehicle that moves using electricity as power has emerged as an alternative to vehicles using fossil fuels.

An electric vehicle uses a drive motor which is driven by electricity supplied from a battery, and accordingly does not emit carbon dioxide gas. Therefore, it has come into the spotlight as an eco-friendly vehicle. Recently, development of electric vehicles has been spurred by soaring oil price and tightened emission regulations, and the market scale of electric vehicles has been rapidly increasing.

However, to exhibit high efficiency, the electric vehicle needs to be lightweight and compact. Accordingly, a method of efficiently cooling the interior of a compact battery which is demanded.

DISCLOSURE

Technical Problem

The object of the present invention is to provide a battery-cooling system for an electric vehicle which is capable of efficiently cooling a battery.

Technical Solution

The object of the present invention can be achieved by providing a battery-cooling system for an electric vehicle including an air-conditioning device to cool an interior of the vehicle, a battery including a plurality of cell module assemblies, a battery-cooling unit to connect the air-conditioning device and the battery and to supply air cooled by the air-conditioning device directly into the battery to cool the battery.

In another aspect of the present invention, provided herein is a battery-cooling system for an electric vehicle including a battery including a plurality of cell module assemblies, a battery-cooling unit to cause external cool air to pass through an interior of the battery to cool the battery, wherein the battery-cooling unit include a suction fan to suction the air having cooled the interior of the battery and discharge the suctioned air.

Advantageous Effects

According to one embodiment of the present invention, a battery-cooling system for an electric vehicle is configured such that air cooled by an air-conditioning device is directly supplied to a battery without passing through the interior of a vehicle. As the interior of the vehicle and the battery are independently cooled, noise or foreign substances from the interior of the vehicle may be prevented from being introduced into the battery, and cooling of the interior of the vehicle and cooling of the battery may be independently controlled.

In addition, since the air-conditioning device and the battery are directly connected to the introduction duct, the length of the flow passage is reduced compared to the case in which the air-conditioning device and the introduction duct battery are connected to the introduction duct via the interior of the vehicle. Thereby, heat loss may be reduced and, accordingly, cooling performance may be improved. In addition, the size of a fan to create flow of air in the battery may be advantageously reduced.

In addition, a cooling system for an electric vehicle according to an embodiment of the present invention has a suction fan provided to a discharge duct which discharges air from the battery. Thereby, the air in the battery may be suction and discharged. As the air in the battery is suction and discharged by the suction fan, flow resistance may be reduced and thus smooth flow of air may be ensured, compared to the case in which the fan is provided to the introduction duct to blow air into the battery. Accordingly, cooling performance may be enhanced.

Further, as the air in the battery is suctioned and discharged by the suction fan installed at the discharge duct of the battery, pressure difference is created between the interior and exterior of the battery. Thereby, the air may be naturally suctioned from the exterior of the battery into the battery. Accordingly, compared to the case in which the fan is installed at the suction side to forcibly blow the air into the battery, flow resistance may be reduced, and smooth flow of air may be ensured. Therefore, cooling performance may be improved.

In addition, since the introduction duct is connected to the central portion of the battery, circulation of air in the battery may be enhanced, thereby uniformly cooling the interior of the battery.

Moreover, air through holes are formed between the cell modules and an internal discharge duct is coupled to correspond to the air through holes. Thereby, when the suction fan is driven, the air in the battery may pass through the air through holes and then be discharged through the internal discharge duct. Accordingly, smooth flow of air between the cell modules may be created, improving the cooling performance.

BEST MODE

Hereinafter, a battery-cooling system for an electric vehicle according to embodiments of the present invention will be described in detail with reference to the accompanying drawings.

Figure 1:
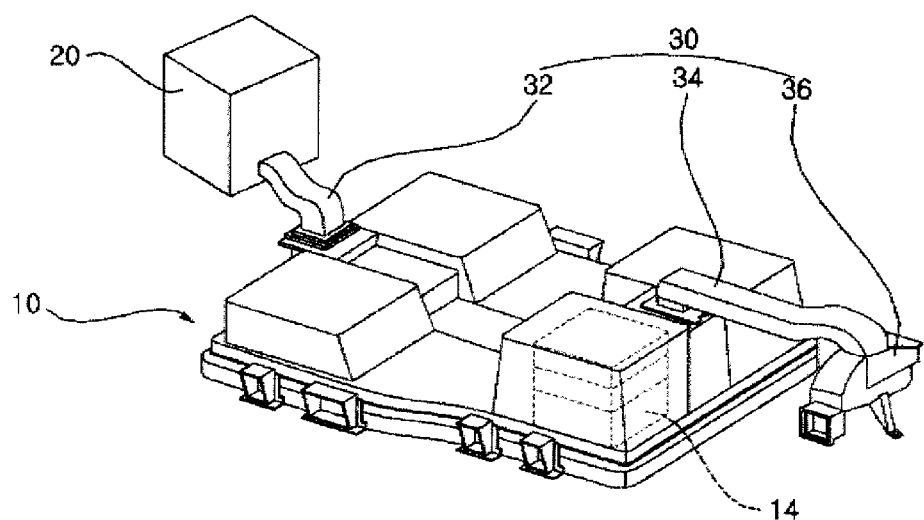
FIG. 1 is a perspective view illustrating a battery-cooling system for an electric vehicle according to a first embodiment of the present invention.
Figure 2:
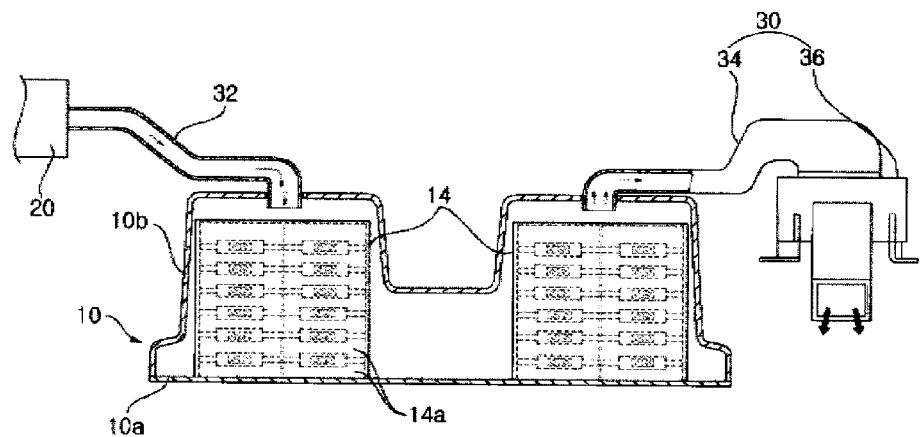
FIG. 2 is a longitudinal cross-sectional view of FIG. 1.

FIG. 1 is a perspective view illustrating an air-conditioning device 20 for an electric vehicle and a battery-cooling unit 30 according to a first embodiment of the present invention. FIG. 2 is a longitudinal cross-sectional view of FIG. 1.

Referring to FIGS. 1 and 2, a battery-cooling system for an electric vehicle of this embodiment includes a battery 10 used as power source to supply electric power, a drive motor (not shown) driven by the electric power to supplied to the battery 10, a battery-cooling unit 30 to cool the battery 10, and an air-conditioning device 20 to condition the air in the interior of the electric vehicle.

The battery 10 is also called an energy storage module (ESM), and will hereinafter be simply referred to as a battery. The battery 10 includes a plurality of cell module assemblies (CMAs) 14.

The CMAs 14, which generate electric current, are formed by vertically stacking a plurality of cell modules 14a. The cell modules 14a may also be stacked in the front-to-back direction or lateral direction.

The plurality of CMAs 14 is placed on a battery carrier 10a, and a battery cover 10b is mounted to the upper side of the battery carrier 10a.

The battery carrier 10a may be coupled to the floor of the vehicle body by a fastening member, or the like.

The battery cover 10b may be coupled with, for example, a battery-cooling unit 30, which will be described later.

The electric vehicle includes an air-conditioning device 20 to condition the air in the interior of the vehicle through a refrigerant.

Figure 3:
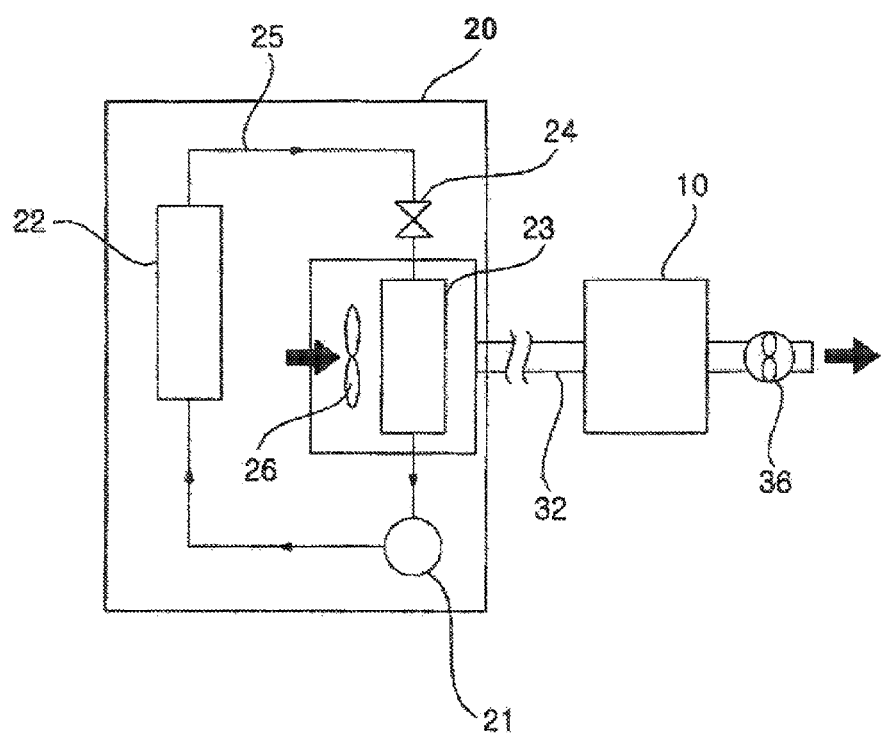
FIG. 3 is a block diagram schematically illustrating the battery-cooling system for an electric vehicle shown in FIG. 1.

Referring to FIG. 3, the air-conditioning device 20 includes a compressor 21, a condenser 22, an evaporator 23, and an expansion unit 24. The compressor 21, the condenser 22, the evaporator 23, and the expansion unit 24 are connected to a refrigerant circulation flow passage 25 through which the refrigerant circulates. An air blowing fan 26 to blow external air is installed on a side surface of the evaporator 23.

The evaporator 23 and the battery 10 are connected by an introduction duct 32, which will be described later, the external air may be cooled in the evaporator 23 and then supplied to the battery 10. In addition, the evaporator 23 may also be connected to the interior of the vehicle by a duct (not shown) such that the air cooled in the evaporator 23 can be supplied to the interior of the vehicle. The introduction duct 32 may be connected to the duct (not shown) that connects the interior of the vehicle and the evaporator 23, or may be directly connected to the evaporator 23.

The battery-cooling unit 30 is connected to the air-conditioning device 20 such that the cool air having undergone heat exchange in the air-conditioning device 20 is directly supplied to the interior of the battery 10 to cool the battery 10.

The battery-cooling unit 30 includes an introduction duct 32 to connect the air-conditioning device 20 directly to the battery 10, a discharge duct 34 to discharge air from the battery 10, and a suction fan 36 provided in the discharge duct 34.

One end of the introduction duct 32 is coupled to the air-conditioning device 20, and the other end of the introduction duct 32 is coupled to one side of the battery 10. Thereby, the introduction duct 32 guides the cool air having undergone heat exchange in the air-conditioning device 20 into the battery 10. The introduction duct 32 is connected to the evaporator 23 to guide at least one portion of the cool air having passed through the evaporator 23 to the battery 10.

One end of the discharge duct 34 is coupled to the other end of the battery 10 and the other end 38 is disposed to face outward. Preferably, the discharge duct 34 is positioned at a location opposing the location of the introduction duct 32 to allow circulation of the cool air.

The suction fan 36 is installed at the discharge duct 34 to suction the air in the battery 10 and discharge the air outside.

Hereinafter, operation of the first embodiment configured as above will be described.

When the air-conditioning device 20 is driven, the external air is blown by the air blowing fan 26 and cooled in the evaporator 23. At least one portion of the air cooled in the evaporator 23 is introduced into the introduction duct 32.

When the suction fan 36 is driven, the air in the battery 10 is discharged to the outside by the suction force of the suction fan 36. As the air is discharged from the battery 10, pressure difference is produced between the interior and exterior of the battery 10. Thereby, the cool air is naturally suctioned into the battery 10 through the introduction duct 32. That is, as the air is discharged from the interior of the battery 10 by driving the suction fan 36, the external cool air is consistently and naturally suctioned into the battery 10.

In the case in which the suction fan 36 is installed at the discharge side of the battery 10 as described above, flow resistance may be reduced compared to the case in which the suction fan is installed at the suction side to forcibly blow the air into the battery 10, and thus smooth airflow may be created. Thereby, cooling performance may be improved.

In addition, since the air cooled by the air-conditioning device 20 is directly introduced into the battery without passing through the interior of the vehicle, the interior of the vehicle and the battery 10 may be independently cooled.

In addition, by the structure of independent cooling of the interior of the vehicle and the battery 10, noise, foreign substances, or the like in the interior of the vehicle may be prevented from being introduced into the battery 10.

In addition, since the air-conditioning device 20 and the battery 10 are directly connected to the introduction duct 32, heat loss according to the length of the flow passage may be reduced, and accordingly cooling performance may be improved.

Figure 4:
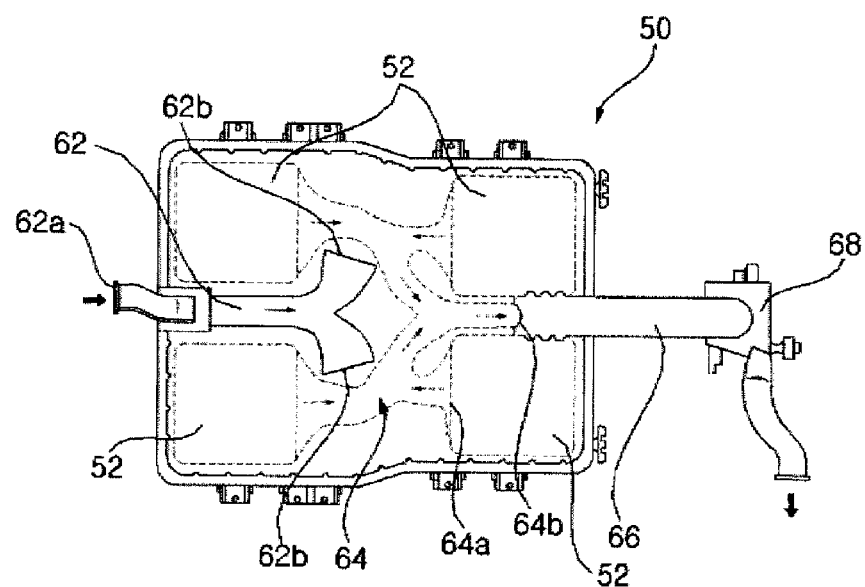
FIG. 4 is a plan view illustrating a battery-cooling system for an electric vehicle according to a second embodiment of the present invention.
Figure 5:
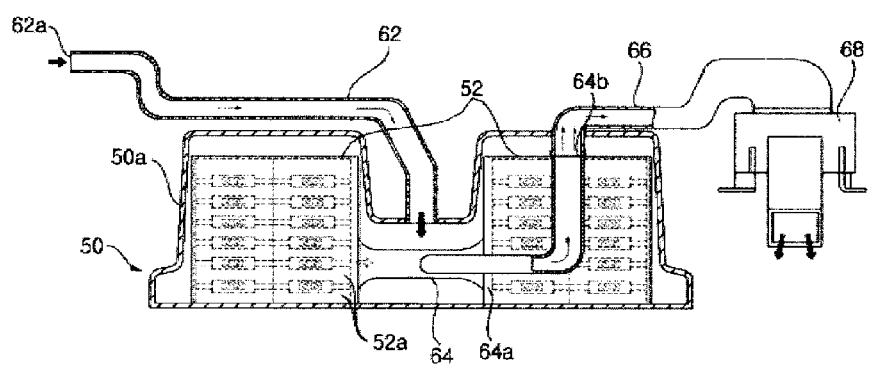
FIG. 5 is a longitudinal cross-sectional view of FIG. 4.
Figure 6:
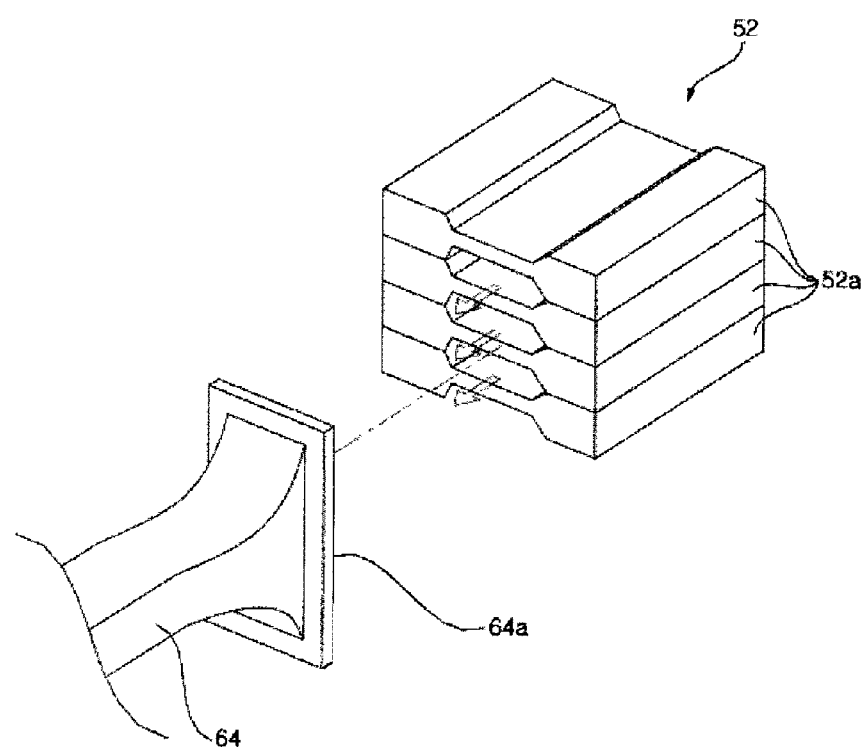
FIG. 6 is an exploded perspective view illustrating a cell module assembly and an internal discharge duct which are shown in FIG. 5.

FIG. 4 is a plan view illustrating a battery-cooling system for an electric vehicle according to a second embodiment of the present invention. FIG. 5 is a longitudinal cross-sectional view of FIG. 4. FIG. 6 is an exploded perspective view illustrating a cell module assembly and an internal discharge duct which are shown in FIG. 5.

Referring to FIGS. 4 to 6, the battery-cooling system for an electric vehicle according to the second embodiment includes a battery 50 having a plurality of CMAs 52 and a battery-cooling unit to cool the battery 50 using cool external air. The battery-cooling unit includes a suction fan 68 to suction and discharge the air having cooled the plurality of the CMAs 52.

The battery-cooling unit includes an introduction duct 62 to guide cool external air into the battery 50, an internal discharge duct 64 to guide the air having passed through the CMAs 52 such that the air is discharged from the battery 50, and an external discharge duct 66 connected to the internal discharge duct 64 and provided with the suction fan 68.

The introduction duct 62 may guide the external air such that the air is directly introduced, or may be connected to an air-conditioning device (not shown) to guide introduction of the air cooled in the air-conditioning device (not shown), or may be connected to the interior of the vehicle (not shown) to guide introduction of the air having cooled the interior of the vehicle.

The introduction duct 62 is connected to the center of the battery 50 to guide the cool external air to the center or the plurality of CMAs 52. That is, an end of the introduction duct 62 is connected to the central portion of the battery 50. In this embodiment, it is assumed that the plurality of CMAs 52 includes four CMAs spaced a predetermined distance from each other. Preferably, the introduction duct 62 is disposed such that the air is introduced into the center of the four CMAs 52.

In addition, while the introduction duct 62 is illustrated as being branched into two ends 62a and 62b and connected to the battery 50 in this embodiment, it may not be branched but have one end connected to the battery 50, or may be branched to have as many ends as the number of the CMAs 52.

The internal discharge duct 64 is directly connected to the four CMAs 52 in a manner that the four connections are combined together.

As shown in FIG. 6, the CMA 52 is formed by stacking a plurality of cell modules 52a. The plurality of cell modules 52a include therein spaces which are spaced a predetermined distance from each other. The spaces define the air through holes 52b. As the cool air passes through the air through holes 52b, it may cool the cell modules 52a.

One end 64a of the internal discharge duct 64 is coupled so as to communicate with the air through holes 52b of the CMA 52.

The other end 64b of the internal discharge duct 64 is coupled to the external discharge duct 66.

Hereinafter, operation of the battery-cooling system configured as above will be described.

First, when the suction fan 68 is driven, the air in the battery 50 is discharged to the outside by the suction force of the suction fan 68 and pressure difference is produced between the interior and exterior of the battery 50. Thereby, the external air may be naturally suctioned into the center of the interior of the battery 50 through the introduction duct 62.

The cool air introduced into the battery 50 cools the exterior of the CMA 52.

Since the internal discharge duct 64 is connected to the air through hole 52b of the CMA 52, the air in the air through hole 52b is suctioned and discharged through the internal discharge duct 64 by the suction force of the suction fan 68. As the air in the air through holes 52b is suction and discharged, the pressure in the air through holes 52b is lowered, and accordingly the air around the CMA 52 is introduced into the air through holes 52b.

Accordingly, the cool air introduced into the battery 50 may cool the exterior of the CMA 52, pass through the air through holes 52b, and then be discharged through the internal discharge duct 64.

Blowing the air into the air through holes 52b to pass through the air through holes 52b may lead to high flow resistance and obstruct smooth flow of air since the air through holes 52b are small. On the other hand, discharging the air from the air through holes 52b with the suction fan 68 may reduce flow resistance and allow smooth flow of air, thereby enhancing the flow rate of the air. Accordingly, the performance of cooling the interior of the CMA 52 may be improved.

It will be apparent to those skilled in the art that various modifications and variations can be made in the present invention without departing from the spirit or scope of the invention. Therefore, the embodiments described above should be understood as being illustrative, not limitative. Those skilled in the art will appreciate that the scope of the present invention is defined by the accompanying claims rather than by the detailed description given above and the present invention covers the modifications and variations of this invention provided they come within the scope of the appended claims and their equivalents.

INDUSTRIAL APPLICABILITY

According to embodiments of the present invention, a battery-cooling system for an electric vehicle that has an improved cooling efficiency may be implemented.

The invention claimed is:

1. A battery-cooling system for an electric vehicle comprising:
    an air-conditioning device to cool an interior of the vehicle;
    a battery case housing a plurality of cell module assemblies;
    a battery-cooling unit to connect the air-conditioning device and the battery case and to supply air cooled by the air-conditioning device directly into the battery case to cool the plurality of cell module assemblies, wherein the battery-cooling unit includes;
        an introduction duct connecting the air-conditioning device and the battery case to guide the air from the air-conditioning device to the battery case;
        an external discharge duct connected to a top surface of the battery case;
        a suction fan installed in the external discharge duct to draw the air from the battery case and to discharge the air to an outside of the vehicle; and
        an internal discharge duct provided in the battery case and connected to the external discharge duct, wherein the introduction duct passes through a center line of the top surface of the battery case and is branched into a plurality of ends in the battery case to introduce air to the plurality of cell module assemblies, wherein each of the plurality of cell module assemblies includes a plurality of cell modules which are stacked, and each of the cell module assemblies has air through holes formed between the plurality of cell modules, and wherein the internal discharge duct is connected to the plurality of cell module assemblies to communicate with the air through holes.

2. The battery-cooling system according to claim 1, wherein the air-conditioning device includes an evaporator to cause heat exchange to occur between a refrigerant and air to cool the air,
wherein the introduction duct is connected to the evaporator to guide at least one portion of the cooled air having passed through the evaporator into the battery case.

* * * * *